United States Patent
Koh et al.

(10) Patent No.: US 11,058,954 B1
(45) Date of Patent: Jul. 13, 2021

(54) SYSTEM AND METHOD FOR IMPLEMENTING A SECONDARY GAME WITHIN AN ONLINE GAME

(71) Applicant: ELECTRONIC ARTS INC., Redwood City, CA (US)

(72) Inventors: James Koh, Mountain View, CA (US); Kellen Christopher Smalley, Pleasanton, CA (US); Michael C. Caldarone, Palo Alto, CA (US); Stephanie Schultz, San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 884 days.

(21) Appl. No.: 14/043,803

(22) Filed: Oct. 1, 2013

(51) Int. Cl.
*A63F 13/79* (2014.01)
*A63F 13/80* (2014.01)

(52) U.S. Cl.
CPC .............. *A63F 13/79* (2014.09); *A63F 13/80* (2014.09)

(58) Field of Classification Search
CPC .......... A63F 13/00; A63F 13/10; A63F 13/12; A63F 13/79; A63F 13/85; A63F 13/80; A63F 13/88; G07F 17/3244; G07F 17/3255
USPC ...................................................... 463/1, 25
See application file for complete search history.

(56) References Cited

U.S. PATENT DOCUMENTS

| | | |
|---|---|---|
| 5,816,918 A | 10/1998 | Kelly |
| 5,933,813 A | 8/1999 | Teicher |
| 5,964,660 A | 10/1999 | James |
| 6,015,344 A * | 1/2000 | Kelly ...................... A63F 3/081 463/16 |
| 6,142,472 A | 11/2000 | Kliebisch |
| 6,190,225 B1 | 2/2001 | Coleman |
| 6,190,255 B1 | 2/2001 | Thomas et al. ................. 463/20 |
| 6,306,033 B1 | 10/2001 | Niwa et al. |
| 6,347,996 B1 | 2/2002 | Gilmore et al. ............... 463/17 |

(Continued)

FOREIGN PATENT DOCUMENTS

| | | |
|---|---|---|
| KR | 1020130137431 | 12/2013 |
| WO | 2002026333 | 1/2002 |

(Continued)

OTHER PUBLICATIONS

WikiGameGuides, Super Stickman Golf 2 Gameplay Part 1 iOS Android, Mar. 19, 2013, YouTube, <https://www.youtube.com/watch?v=3MAPTVVmxGg> (Year: 2013).*

(Continued)

*Primary Examiner* — Chase E Leichliter
(74) *Attorney, Agent, or Firm* — Knobbe, Martens, Olson & Bear, LLP

(57) ABSTRACT

One aspect of the disclosure relates to implementing a secondary game within an online game. In the secondary game, a player may be provided with more than one turn, and/or to win more than one prize. The secondary game may commence with a finite set of potential awards or prizes. At individual turns, individual ones of the set of potential awards may be provided to the player. The player may have the opportunity to take turns in the secondary game until all of the potential awards have been "won." Costs of the individual turns may be determined based on the value of the potential awards in the set of potential awards that have not yet been won.

12 Claims, 12 Drawing Sheets

(56) References Cited

U.S. PATENT DOCUMENTS

| | | |
|---|---|---|
| 6,402,619 B1 | 6/2002 | Sato |
| 6,561,904 B2 | 5/2003 | Locke |
| 6,604,008 B2 | 8/2003 | Chudley |
| 6,607,437 B2 | 8/2003 | Casey et al. ............... 463/16 |
| 6,745,236 B1 | 6/2004 | Hawkins |
| 6,811,483 B1 | 11/2004 | Webb |
| 6,811,484 B2 | 11/2004 | Katz et al. |
| 6,850,900 B1 | 2/2005 | Hare |
| 6,857,959 B1* | 2/2005 | Nguyen ............... G07F 17/32 340/323 R |
| 6,928,474 B2 | 8/2005 | Venkatesan |
| 7,050,868 B1 | 5/2006 | Graepel |
| 7,076,453 B2 | 7/2006 | Jammes |
| 7,136,617 B2 | 11/2006 | Libby |
| 7,156,733 B2 | 1/2007 | Chiang et al. |
| 7,192,352 B2 | 3/2007 | Walker et al. |
| 7,326,115 B2 | 2/2008 | Baerlocher |
| 7,357,718 B2* | 4/2008 | Yamaoka ............ A63F 13/335 463/41 |
| 7,381,133 B2 | 6/2008 | Thomas .................... 463/20 |
| 7,455,586 B2 | 11/2008 | Nguyen et al. |
| 7,533,336 B2 | 5/2009 | Jaffe |
| 7,660,740 B2 | 2/2010 | Boone |
| 7,682,239 B2 | 3/2010 | Friedman |
| 7,749,056 B2 | 7/2010 | Ando et al. |
| 7,785,188 B2 | 8/2010 | Cannon |
| 7,813,821 B1 | 10/2010 | Howell |
| 7,819,749 B1 | 10/2010 | Fish |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,066,571 B2 | 11/2011 | Koster |
| 8,147,340 B2 | 4/2012 | Courssou |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf |
| 8,231,470 B2 | 7/2012 | Feeney |
| 8,239,487 B1 | 8/2012 | Hoffman et al. ............ 709/218 |
| 8,246,439 B2 | 8/2012 | Kelly |
| 8,272,934 B2 | 9/2012 | Olive |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker |
| 8,317,584 B2 | 11/2012 | Aoki |
| 8,317,601 B1 | 11/2012 | Luciano, Jr. |
| 8,323,110 B2 | 12/2012 | Shibamiya |
| 8,328,642 B2 | 12/2012 | Mosites |
| 8,332,260 B1 | 12/2012 | Mysen |
| 8,332,544 B1 | 12/2012 | Ralls |
| 8,348,716 B2 | 1/2013 | Ganz |
| 8,348,762 B2 | 1/2013 | Willis |
| 8,348,767 B2 | 1/2013 | Mahajan |
| 8,348,768 B2 | 1/2013 | Auterio |
| 8,360,858 B2 | 1/2013 | LaRocca |
| 8,360,867 B2 | 1/2013 | VanLuchene |
| 8,360,868 B2 | 1/2013 | Shvili |
| 8,366,544 B2 | 2/2013 | Walker |
| 8,366,550 B2 | 2/2013 | Hermann |
| 8,371,925 B2 | 2/2013 | Bonney et al. ............ 463/20 |
| 8,376,826 B2 | 2/2013 | Katz |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett |
| 8,409,015 B2 | 4/2013 | Van Luchene |
| 8,439,759 B1 | 5/2013 | Mello |
| 8,475,262 B2 | 7/2013 | Wolf |
| 8,506,394 B2 | 8/2013 | Kelly |
| 8,512,150 B2 | 8/2013 | Herrmann |
| 8,583,266 B2 | 11/2013 | Herbrich |
| 8,636,591 B1 | 1/2014 | Hawk |
| 8,696,428 B1 | 4/2014 | Post |
| 8,715,068 B2 | 5/2014 | Arnone |
| 8,777,754 B1 | 7/2014 | Santini |
| 8,784,214 B2 | 7/2014 | Parks |
| 8,790,185 B1 | 7/2014 | Caldarone |
| 8,821,260 B1 | 9/2014 | DeSanti |
| 8,831,758 B1 | 9/2014 | Chu |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis |
| 9,138,639 B1 | 9/2015 | Ernst |
| 9,218,714 B2 | 12/2015 | Arnone |
| 9,257,007 B2 | 2/2016 | Santini |
| 9,508,222 B1 | 11/2016 | McLellan et al. |
| 9,539,502 B1 | 1/2017 | Yu et al. |
| 9,561,433 B1 | 2/2017 | Pieron et al. |
| 9,579,564 B1 | 2/2017 | Yu et al. |
| 9,623,320 B1 | 4/2017 | DeSanti et al. |
| 9,675,891 B2 | 6/2017 | Pieron et al. |
| 9,717,986 B1 | 8/2017 | Kawaguchi et al. |
| 9,737,819 B2 | 8/2017 | DeSanti et al. |
| 9,799,163 B1 | 10/2017 | Kim et al. |
| 9,928,688 B1 | 3/2018 | Kim et al. |
| 9,931,570 B1 | 4/2018 | Yu et al. |
| 10,115,267 B1 | 10/2018 | Yu et al. |
| 10,188,951 B2 | 1/2019 | Kawaguchi et al. |
| 10,201,758 B2 | 2/2019 | McLellan et al. |
| 10,226,707 B1 | 3/2019 | Pieron et al. |
| 10,252,168 B1 | 4/2019 | DeSanti et al. |
| 10,384,134 B1 | 8/2019 | Caldarone |
| 10,456,689 B2 | 10/2019 | Pieron et al. |
| 10,482,713 B1* | 11/2019 | Schultz ............... G07F 17/3267 |
| 2002/0059397 A1 | 5/2002 | Feola |
| 2002/0072412 A1 | 6/2002 | Young |
| 2002/0094863 A1 | 7/2002 | Klayh |
| 2002/0095327 A1 | 7/2002 | Zumel |
| 2002/0115488 A1 | 8/2002 | Berry |
| 2002/0119824 A1 | 8/2002 | Allen |
| 2002/0151351 A1 | 10/2002 | Baerlocher |
| 2002/0165794 A1 | 11/2002 | Ishihara |
| 2002/0183105 A1 | 12/2002 | Cannon |
| 2002/0193162 A1 | 12/2002 | Walker |
| 2003/0008713 A1 | 1/2003 | Ushiro |
| 2003/0027619 A1 | 2/2003 | Nicastro, Sr. ................ 463/16 |
| 2003/0032476 A1 | 2/2003 | Walker |
| 2003/0102625 A1 | 6/2003 | Katz |
| 2003/0109301 A1 | 6/2003 | Chudley |
| 2003/0157978 A1 | 8/2003 | Englman |
| 2003/0174178 A1 | 9/2003 | Hodges |
| 2003/0190960 A1 | 10/2003 | Jokipii |
| 2003/0216167 A1 | 11/2003 | Gauselmann |
| 2004/0002387 A1 | 1/2004 | Grady |
| 2004/0068451 A1 | 4/2004 | Lenk |
| 2004/0185932 A1 | 9/2004 | Lombardo |
| 2004/0215524 A1 | 10/2004 | Parkyn |
| 2004/0219969 A1 | 11/2004 | Casey |
| 2004/0224745 A1 | 11/2004 | Bregenzer |
| 2004/0225387 A1 | 11/2004 | Smith |
| 2004/0267611 A1 | 12/2004 | Hoerenz |
| 2005/0096117 A1 | 5/2005 | Katz |
| 2005/0114223 A1 | 5/2005 | Schneider |
| 2005/0165686 A1 | 7/2005 | Zack |
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0063587 A1 | 3/2006 | Manzo |
| 2006/0116196 A1 | 6/2006 | Vancura ..................... 463/20 |
| 2006/0155597 A1 | 7/2006 | Gleason |
| 2006/0200370 A1 | 9/2006 | Ratliff |
| 2006/0217198 A1 | 9/2006 | Johnson |

(56) References Cited

U.S. PATENT DOCUMENTS

| | | | |
|---|---|---|---|
| 2006/0287029 A1 | 12/2006 | Yoshinobu | |
| 2006/0287102 A1 | 12/2006 | White | |
| 2007/0021213 A1 | 1/2007 | Foe | |
| 2007/0060314 A1 | 3/2007 | Baerlocher | |
| 2007/0077988 A1 | 4/2007 | Friedman | |
| 2007/0111770 A1 | 5/2007 | Van Luchene | |
| 2007/0129139 A1 | 6/2007 | Nguyen | |
| 2007/0129147 A1 | 6/2007 | Gagner | |
| 2007/0191101 A1 | 8/2007 | Coliz | |
| 2007/0191102 A1 | 8/2007 | Coliz | |
| 2007/0213116 A1 | 9/2007 | Crawford | |
| 2007/0281285 A1 | 12/2007 | Jayaweera | |
| 2007/0287523 A1 | 12/2007 | Esses | |
| 2008/0009344 A1 | 1/2008 | Graham | |
| 2008/0032787 A1 | 2/2008 | Low | |
| 2008/0058092 A1 | 3/2008 | Schwartz | |
| 2008/0113706 A1 | 5/2008 | OHalloran | |
| 2008/0113815 A1 | 5/2008 | Weingardt | |
| 2008/0124353 A1 | 5/2008 | Brodeur | |
| 2008/0154798 A1 | 6/2008 | Valz | |
| 2008/0171599 A1 | 7/2008 | Salo | |
| 2008/0176625 A1 | 7/2008 | Kelly | |
| 2008/0194318 A1* | 8/2008 | Kralicky | G07F 17/32 463/25 |
| 2008/0200260 A1 | 8/2008 | Deng | |
| 2008/0207306 A1 | 8/2008 | Higbie | |
| 2008/0214295 A1 | 9/2008 | Dabrowski | |
| 2008/0227525 A1 | 9/2008 | Kelly | |
| 2008/0234043 A1 | 9/2008 | McCaskey | |
| 2008/0248867 A1 | 10/2008 | Englman | |
| 2008/0275786 A1 | 11/2008 | Gluck | |
| 2008/0300045 A1 | 12/2008 | Ratcliff | 463/25 |
| 2008/0318668 A1 | 12/2008 | Ching | |
| 2009/0011812 A1 | 1/2009 | Katz | |
| 2009/0017886 A1 | 1/2009 | McGucken | |
| 2009/0036199 A1 | 2/2009 | Myus | |
| 2009/0048918 A1 | 2/2009 | Dawson | |
| 2009/0061982 A1 | 3/2009 | Brito | |
| 2009/0124353 A1 | 5/2009 | Collette | |
| 2009/0204907 A1 | 8/2009 | Finn | |
| 2009/0210301 A1 | 8/2009 | Porter | |
| 2009/0234710 A1 | 9/2009 | Belgaied Hassine | |
| 2009/0315893 A1 | 12/2009 | Smith | |
| 2010/0004048 A1 | 1/2010 | Brito | |
| 2010/0022307 A1 | 1/2010 | Steuer | |
| 2010/0035689 A1 | 2/2010 | Altshuler | |
| 2010/0041472 A1 | 2/2010 | Gagner | |
| 2010/0041481 A1 | 2/2010 | Smedley | |
| 2010/0050088 A1 | 2/2010 | Neustaedter | |
| 2010/0070056 A1 | 3/2010 | Coronel | |
| 2010/0094841 A1 | 4/2010 | Bardwil | |
| 2010/0099471 A1 | 4/2010 | Feeney | |
| 2010/0107214 A1 | 4/2010 | Ganz | |
| 2010/0113162 A1 | 5/2010 | Vemuri | |
| 2010/0174593 A1 | 7/2010 | Cao | |
| 2010/0198653 A1 | 8/2010 | Bromenshenkel | |
| 2010/0210356 A1 | 8/2010 | Losica | |
| 2010/0227675 A1 | 9/2010 | Luxton | |
| 2010/0227682 A1 | 9/2010 | Reville | |
| 2010/0228606 A1 | 9/2010 | Walker | |
| 2010/0240444 A1 | 9/2010 | Friedman | |
| 2010/0241491 A1 | 9/2010 | Eglen | |
| 2010/0241492 A1 | 9/2010 | Eglen | |
| 2010/0306015 A1 | 12/2010 | Kingston | |
| 2011/0065511 A1 | 3/2011 | Mahan | |
| 2011/0092271 A1 | 4/2011 | Nguyen | |
| 2011/0092273 A1 | 4/2011 | Cerbini | |
| 2011/0111841 A1 | 5/2011 | Tessmer | |
| 2011/0112662 A1 | 5/2011 | Thompson | |
| 2011/0113353 A1 | 5/2011 | Koh | |
| 2011/0118002 A1 | 5/2011 | Aoki | |
| 2011/0145040 A1 | 6/2011 | Zahn | |
| 2011/0151957 A1 | 6/2011 | Falciglia | |
| 2011/0218033 A1 | 9/2011 | Englman | |
| 2011/0227919 A1 | 9/2011 | Bongio | |
| 2011/0256921 A1* | 10/2011 | Pacey | G07F 17/32 463/20 |
| 2011/0256936 A1 | 10/2011 | Walker | |
| 2011/0263324 A1 | 10/2011 | Ganetakos | |
| 2011/0275438 A9 | 11/2011 | Hardy et al. | 463/42 |
| 2011/0281638 A1 | 11/2011 | Bansi | |
| 2011/0281654 A1 | 11/2011 | Kelly | |
| 2011/0282764 A1 | 11/2011 | Borst | |
| 2011/0294558 A1* | 12/2011 | Kim | G07F 17/3237 463/17 |
| 2011/0300923 A1 | 12/2011 | Van Luchene | |
| 2011/0319152 A1 | 12/2011 | Ross et al. | 463/20 |
| 2011/0319170 A1 | 12/2011 | Shimura | |
| 2012/0011002 A1 | 1/2012 | Crowe | |
| 2012/0015714 A1 | 1/2012 | Ocko | |
| 2012/0015715 A1 | 1/2012 | Luxton | |
| 2012/0034961 A1 | 2/2012 | Berman | |
| 2012/0034973 A1 | 2/2012 | Frank | |
| 2012/0040743 A1 | 2/2012 | Auterio | |
| 2012/0040761 A1 | 2/2012 | Auterio | |
| 2012/0042282 A1 | 2/2012 | Wong | |
| 2012/0047002 A1 | 2/2012 | Patel | |
| 2012/0059730 A1 | 3/2012 | Jensen | |
| 2012/0083909 A1 | 4/2012 | Carpenter | |
| 2012/0094743 A1 | 4/2012 | Odom | |
| 2012/0101886 A1 | 4/2012 | Subramanian | |
| 2012/0108306 A1 | 5/2012 | Munsell | |
| 2012/0109785 A1 | 5/2012 | Karlsson | |
| 2012/0115593 A1 | 5/2012 | Vann | |
| 2012/0122589 A1 | 5/2012 | Kelly | |
| 2012/0129590 A1 | 5/2012 | Morrisroe | |
| 2012/0130856 A1 | 5/2012 | Petri | |
| 2012/0142429 A1 | 6/2012 | Muller | |
| 2012/0156668 A1 | 6/2012 | Zelin | |
| 2012/0157187 A1 | 6/2012 | Moshal | |
| 2012/0157193 A1 | 6/2012 | Arezina | |
| 2012/0166380 A1 | 6/2012 | Sridharan | |
| 2012/0166449 A1 | 6/2012 | Pitaliya | |
| 2012/0178514 A1 | 7/2012 | Schulzke | |
| 2012/0178515 A1 | 7/2012 | Adams et al. | 463/17 |
| 2012/0178529 A1 | 7/2012 | Collard | |
| 2012/0197874 A1 | 8/2012 | Zatkin | |
| 2012/0202570 A1 | 8/2012 | Schwartz | |
| 2012/0203669 A1 | 8/2012 | Borsch | |
| 2012/0215667 A1 | 8/2012 | Ganz | |
| 2012/0221430 A1 | 8/2012 | Naghmouchi | |
| 2012/0226573 A1 | 9/2012 | Zakas | |
| 2012/0231891 A1 | 9/2012 | Watkins | |
| 2012/0244945 A1 | 9/2012 | Kolo | |
| 2012/0244947 A1 | 9/2012 | Ehrlich | |
| 2012/0244950 A1 | 9/2012 | Braun | |
| 2012/0245988 A1 | 9/2012 | Pace | |
| 2012/0256377 A1 | 10/2012 | Schneider | |
| 2012/0282986 A1 | 11/2012 | Castro | |
| 2012/0283013 A1* | 11/2012 | Guo | G06Q 50/34 463/31 |
| 2012/0289315 A1 | 11/2012 | Van Luchene | |
| 2012/0289330 A1 | 11/2012 | Leydon | |
| 2012/0289346 A1 | 11/2012 | Van Luchene | |
| 2012/0295699 A1 | 11/2012 | Reiche | |
| 2012/0296716 A1 | 11/2012 | Barbeau | |
| 2012/0302329 A1 | 11/2012 | Katz | |
| 2012/0309504 A1 | 12/2012 | Isozaki | |
| 2012/0311504 A1 | 12/2012 | vanOs | |
| 2012/0322545 A1 | 12/2012 | Arnone | |
| 2012/0322561 A1 | 12/2012 | Kohlhoff | |
| 2012/0330785 A1 | 12/2012 | Hamick | |
| 2013/0005437 A1 | 1/2013 | Bethke | |
| 2013/0005438 A1 | 1/2013 | Ocko | |
| 2013/0005466 A1 | 1/2013 | Mahajan | |
| 2013/0005473 A1 | 1/2013 | Bethke | |
| 2013/0005480 A1 | 1/2013 | Bethke | |
| 2013/0006735 A1 | 1/2013 | Koenigsberg | |
| 2013/0006736 A1 | 1/2013 | Bethke | |
| 2013/0012304 A1 | 1/2013 | Cartwright | |
| 2013/0013094 A1 | 1/2013 | Parks | |
| 2013/0013326 A1 | 1/2013 | Miller | |
| 2013/0013404 A1 | 1/2013 | Suprock | |
| 2013/0013459 A1 | 1/2013 | Kerr | |

(56) References Cited

U.S. PATENT DOCUMENTS

| | | |
|---|---|---|
| 2013/0029745 A1 | 1/2013 | Kelly |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | LaRocca |
| 2013/0217489 A1 | 8/2013 | Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0288757 A1 | 10/2013 | Guthridge |
| 2013/0290147 A1 | 10/2013 | Chandra |
| 2013/0303276 A1 | 11/2013 | Weston |
| 2013/0303726 A1 | 11/2013 | Mozzarelli |
| 2013/0310164 A1 | 11/2013 | Walker |
| 2013/0344932 A1 | 12/2013 | Adams |
| 2014/0004884 A1 | 1/2014 | Chang |
| 2014/0018156 A1 | 1/2014 | Rizzotti |
| 2014/0033262 A1 | 1/2014 | Anders |
| 2014/0038679 A1 | 2/2014 | Snow |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |
| 2014/0157314 A1 | 6/2014 | Roberts |
| 2014/0206452 A1* | 7/2014 | Bambino ............... A63F 13/00 463/40 |
| 2014/0243072 A1 | 8/2014 | Santini |
| 2014/0274359 A1 | 9/2014 | Helava |
| 2014/0295958 A1 | 10/2014 | Shono |
| 2014/0315616 A1 | 10/2014 | Avin |
| 2014/0329585 A1 | 11/2014 | Santini |
| 2014/0337259 A1 | 11/2014 | Lamb |
| 2015/0011286 A1 | 1/2015 | Kim |
| 2015/0019349 A1 | 1/2015 | Milley |
| 2015/0031440 A1 | 1/2015 | Desanti |
| 2015/0087378 A1 | 3/2015 | Louie |
| 2015/0306494 A1 | 10/2015 | Pieron |
| 2015/0335995 A1 | 11/2015 | McLellan |
| 2015/0352436 A1 | 12/2015 | Pieron |
| 2016/0346677 A1 | 12/2016 | Kim |
| 2017/0326456 A1 | 11/2017 | Kawaguchi et al. |
| 2019/0255447 A1 | 8/2019 | Tsao |
| 2019/0275422 A1 | 9/2019 | Pieron |

FOREIGN PATENT DOCUMENTS

| | | |
|---|---|---|
| WO | 2013013281 | 1/2013 |
| WO | 2013116904 | 1/2013 |
| WO | WO 2013/059639 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

Andrew Nesvadba, Super Stickman Golf 2 Review, Mar. 14, 2013, AppSpy.com, <https://www.appspy.com/review/6823/super-stickman-golf-2> (Year: 2013).*

Noodlecake Games, Super Stickman Golf 2, iOS, Played on an iPhone, released Mar. 14, 2013 (Year: 2013).*

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

'Quest item—WoWWiki—Your guide to the World of Warcraft', printed from http://www.wowwiki.com/Quest_Item, Retrieved on Apr. 16, 2014, 1 page.

"Rest—WoWWiki—Your guide to the World of Warcraft", printed from http://www.wowwiki.com/Rest, May 19, 2014, 2 pages.

Super Mario Bros. 3, NES Gameplay, http://www.youtube.com/watch?v=82TL-Acm4ts, 1 page.

Super Mario Bros. 3, StrategyWiki, the video game walkthrough and strategy guide, http://strategywiki.org/wiki/Super_Mario_Bros._3, 4 pages.

Super Mario Bros. 3 Review, Nintendo for NES, Feb. 1990, pp. 1-4.

Diablo 2, Blizzard Entertainment, Mar. 23, 2009, manual and online website, http://web.archive.Org/web/20090323171356/http://classic.battle.net/diablo 2exp/items/basics.shtml, 51 pages.

Dreamslayer's Enchanting and Upgrading Guide—With Pictures:D and Explanations, URL: forums.elswordonline.com/Topic5673.aspx [Retrieved Feb. 21, 2013], 10 pages.

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

Gem System—Street Fighter X Tekken, http://www.streetfighter.com/us/sfxtk/features/gem-system, printed Nov. 6, 2012, 6 pages.

MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.

MapleStory—Guides—Equipment Upgrading 101: Potentials, URL: maplestory.nexon.net/guides/game-play/systems/OOFlj/ [Retrieved Jun. 24, 2013], 5 pages.

Path of Exile, Internet posting: http://web.archive.org/web/20120606004658/http://www.pathofexile.com/forum/view-thread/12056, Nov. 16, 2011, 52 pages.

Profession—WoWWiki—Your guide to the World of Warcraft, URL: http://www.wowwiki.com/Profession, printed Nov. 6, 2012, 8 pages.

The Arreat Summit—Items: Basic Item Information, URL: web.archive.org/web/20090323171356/http://classic.battle.net/diablo2exp/items/basics.shtml [Retrieved Feb. 21, 2013], 3 pages.

"Cataclysm Guide: Guild Advancement—Wowhead", http://www.wowhead.com/guide=cataclysm&guilds, printed Dec. 5, 2013, 4 pages.

"Guild Housing System—FlyFF Wiki", http://flyff-wiki.gpotato.com/wiki/Guild_Housing_System, printed Dec. 5, 2013, 5 pages.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

MapleStory—Guides—Equipment Upgrading 101: Enhancements, URL: maplestory.nexon.net/guides/game-play/systems/OOFlk; [Retrieved Jun. 24, 2013] 3 pages.

MapleStory—Guides—Equipment Upgrading 101: Scrolls, URL: maplestory.nexon.net/guides/game-play/systems/OOFFV/#mitigating [Retrieved Jun. 24, 2013], 4 pages.

TFF Challenge—UC Davis, http://tffchallenge.com/team/uc-davis/, printed Jan. 15, 2014, 12 pages.

Elsword—Wikipedia, the free encyclopedia, URL: en.wikipedia.org/wiki/Elsword [Retrieved Feb. 21, 2013], 6 pages.

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

(56) References Cited

OTHER PUBLICATIONS

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.
"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.
"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--.
"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.
City Coins. CityVille Wikia. Online. Accessed via the Internet. Accessed Aug. 9, 2014. <URL: http://cityville.wikia.com/wiki/City_Coins>, 2 pages.
"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.
"Behavioural Analytics & Campaigning", http://lotaris.com/behavioural._analytics_and._Campaigning.htm, screenshot access date May 24, 2012 2:21 PM, 1 page.
"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.
FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.
Gaia "Black Friday Bundle" available on Nov. 23, 2011, from http://www.gaiaonline.com/forum/community-announcements/black-friday-big-bundles-rare-items/t.76127933/, 5 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.
MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.
TFWiki "teamfortress wiki" available Nov. 5, 2011 retrieved from https://web.archive.org/web/20111105044256/http://wiki.teamfortress.com/wiki/Loadout, 4 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online", available on Sep. 9, 2011, https://web.archive.org/web/20110927210155/http://en.wikipedia.org/wiki/Gaia_Online, 8 pages.
"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
<http://lotro-wiki.com/index.php?title=Ouest:A_Little_Extra_Never_Hurts_--_Part_2&oldid=399366>, <http://lotrowiki.com/index.php ?title=Getting_ Started&oldid=349681 >. Links are to used articles. (7 pgs) Feb. 26, 2014.
"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_--_Part_1 &oldid=399597> (28 pgs).
"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.
Elsword, Dec. 27, 2007, KOG Studios, guide posted Mar. 17, 2011 https ://web.arch ive.org/web/20110509033123/http :/ /forums.elswordon I ine.com/Topic5673.aspx, http://en.wikipedia.org/wiki/Elsword.
"Getting Started" written by BoD, published on Oct. 13, 2011 and printed from URL <http://lotrowiki.com/index.php?title=Getting_Started&oldid=349681>, 5 pages.
"Lotro Store" written by Elinnea, published on Dec. 15, 2011 and printed from URL <http://lotrowiki.com/index.php?title=LOTRO_Store&oldid=396550>, 23 pages.
"Main Page" written by Starbusty, published on Dec. 12, 2011 and printed from URL <http://lotrowiki.com/index.php?title=Main_Page&oldid=394429>, 2 pages.
New Feature: Tiered Tournaments and Tournament Updates, printed from http://community.kabam.com/forums/showthread.php?171349-New-Feat on Feb. 11, 2014, 2 pages.
Niki "Gaia online"', available on Sep. 9, 2011, hllps://web.archive.org/web/20110927210155/hllp://en.wikipedia.Jrg/wiki/Gaia_Online, 8 pages.
"Quest: A Little Extra Never Hurts—Part 1" written by Zimoon, published on Dec. 22, 2011 and printed from URL <http://lotro-wiki.com/index.php?title=Quest:A_Little_Never_Hurts_--_Part_1 &oldid=399597>, 3 pages.
"Quest: A Little Extra Never Hurts—Part 2" written by Zimoon, published on Dec. 21, 2011 and printed from URL <http://lotro-wiki.com/index.php?title=Quest:A_Little_Never_Hurts_--_Part_2 &oldid=399366>, 2 pages.
Wikipedia, Mafia Wars, <http://en.wikipedia.orq/wiki/Mafia Wars>, Jan. 28, 2012, 3 pages.

\* cited by examiner

SYSTEM AND METHOD FOR IMPLEMENTING A SECONDARY GAME WITHIN AN ONLINE GAME

FIELD

The disclosure relates to implementing a secondary game within an online game.

BACKGROUND

In various online games, players are provided a secondary game in which they have an opportunity to win one or more virtual items that are usable within the online game. After a prize from the secondary game has been awarded, the players may return to playing the primary game.

SUMMARY

One aspect of the disclosure relates to implementing a secondary game within an online game. In the secondary game, a player may be provided with more than one turn, and/or to win more than one prize. The secondary game may commence with a finite set of potential awards or prizes. At individual turns, individual ones of the set of potential awards may be provided to the player. The player may have the opportunity to take turns in the secondary game until all of the potential awards have been "won." Costs of the individual turns may be determined based on the value of the potential awards in the set of potential awards that have not yet been won.

A system for hosting an online game for players may include one or more processors configured to execute compute program modules. The program modules may comprise a game module, a user module, a secondary game module, and/or any other modules.

The game module may be configured to execute an instance of online game. The game module may implement the instance of the online game by receiving and executing commands in the instance of the online game to facilitate player participation in the online game. The game module may facilitate presentation of the online game on client computing platforms and/or any other platforms.

The user module may be configured to store inventories of items that are available to the players in the game space. The inventories may include a first inventory of items available to a first player in the game space. The items may include a first virtual item and/or any other item. A virtual item may be an item that can be used in the game instance by the player. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

The secondary game module may be configured to selectively provide access to the players of a secondary game to facilitate player participations in individual episodes of the secondary game, an individual episode including one or more player. For a first episode, the secondary game may be configured to obtain a set of potential awards for the first episode, and provide a first turn to a first player. The individual potential awards may include virtual items usable in the online game. For the first turn, the secondary game module may be configured to obtain a set of award probabilities for the set of potential awards, stochastically or quasi-stochastically, select a first potential award as an actual award for distribution for the first turn based on the award probabilities, and distribute the first potential award to the first player for use within the online game.

The secondary game module may be configured to effectuate presentation of an offer to the first player for a second turn in the first episode, the offer may include a cost for the second turn. Responsive to the first player accepting the offer and reception of payment of the cost from the first player, the secondary game module may provide a second turn of the first episode to the first player. For the second turn, the secondary game module may be configured to obtain a set of award probabilities for the set of potential awards minus the first potential award, stochastically or quasi-stochastically, select a second potential award as an actual award for distribution for the second turn based on the award probabilities, and distribute the second potential award to the first player and/or any other player for use within the online game.

The secondary game module may be configured to determine the cost for the second turn based on remaining potential awards. The remaining potential award may be the set of potential awards minus distributed potential awards and/or any other awards.

The secondary game module may be configured to determine the set of award probabilities based on the values of remaining potential awards. The remaining potential award may be the set of potential awards minus distributed potential awards and/or any other awards.

The secondary game module may be configured to determine the set of award probabilities for the second turn based on the value of the first potential award and/or any other awards. The secondary game module may be configured to provide additional turns to the player until the set of potential awards and/or any other awards have been distributed.

The secondary game module may be configured to provide additional turns to the player for a higher cost than each prior individual turn and/or any other turn. The secondary game module may be configured to provide additional turns to the player for a lower cost than each prior individual turn and/or any other turn.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
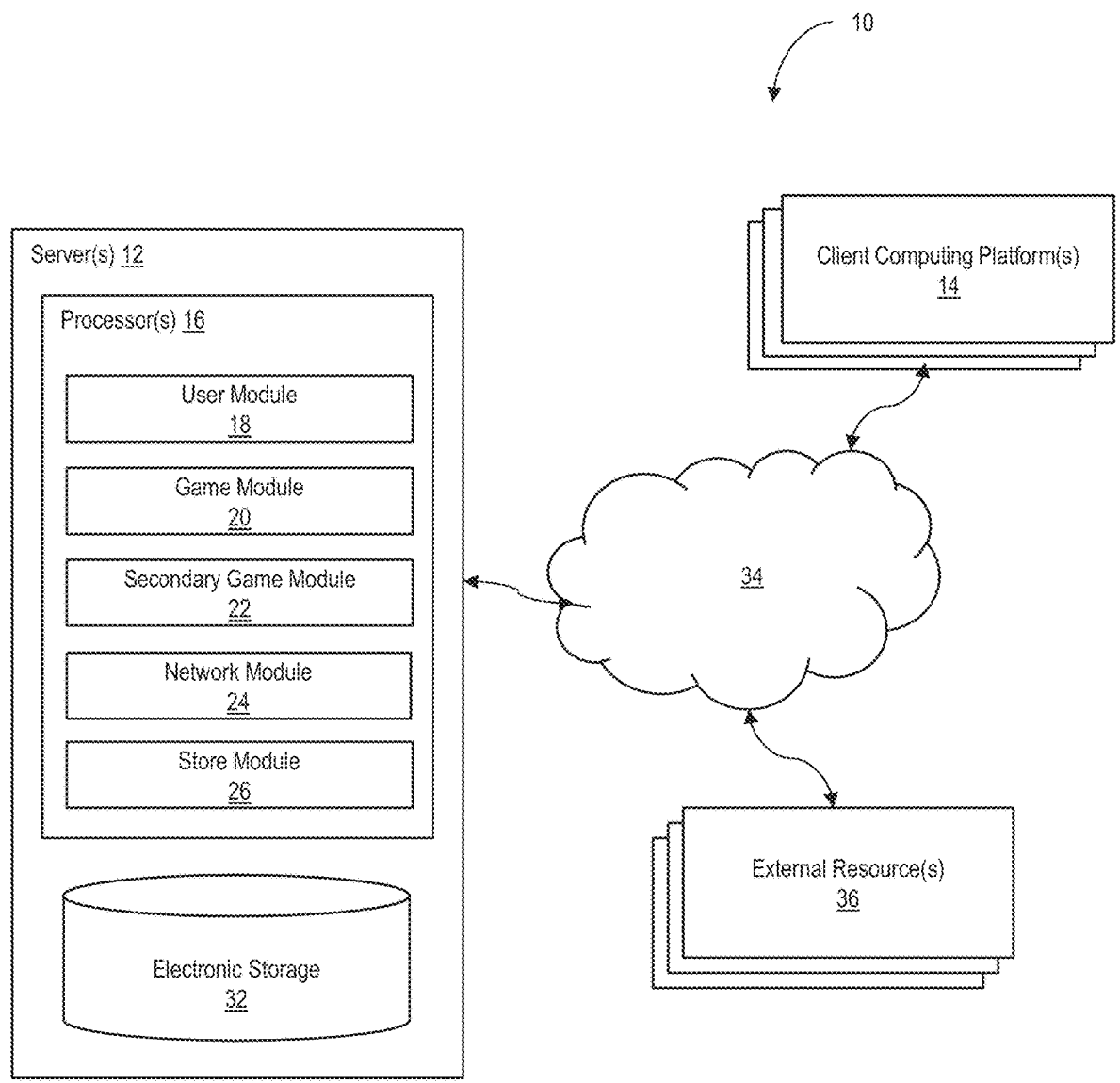
FIG. 1 illustrates an exemplary system configured to implement a secondary game within an online game, according to an aspect of the invention.

FIG. 1 illustrates a system 10 configured facilitate providing a secondary game within an online game, according to an aspect of the invention. In some implementations, system 10 may include a game server(s) 12. The game server(s) 12 may host a game space in which an online game takes place. The game server(s) 12 may be configured to communicate with one or more client computing platform(s) 14 according to a client/server architecture. The players may access system 10 and/or the virtual space via client computing platform(s) 14.

The game server(s) 12 may be configured to execute one or more computer program modules. The computer program modules may include one or more of a user module 18, a game module 20, a secondary game module 22, a network module 24, a store module 26, and/or any other modules.

The system may comprise a user module 18 configured to store inventories of virtual items that are available to players in the game space. The inventories may include a first inventory and/or any other inventory of virtual items available to a first player in the game space.

The user module 18 may be configured to access and/or manage one or more player profiles and/or player information associated with players of the system 10. The one or more player profiles and/or player information may include information stored by game server(s) 12, one or more of the client computing platform(s) 14, and/or other storage locations. The player profiles may include, for example, information identifying players (e.g., a player name or handle, a number, an identifier, and/or other identifying information) within the virtual space, security login information (e.g., a login code or password), virtual space account information, subscription information, virtual currency account information (e.g., related to currency held in credit for a player), relationship information (e.g., information related to relationships between players in the virtual space), virtual space usage information, demographic information associated with players, interaction history among players in the virtual space, information stated by players, purchase information of players, browsing history of players, a client computing platform identification associated with a player, a phone number associated with a player, and/or other information related to players.

The user module 18 may be configured to store inventories of virtual items including resources that are available to players in the virtual space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (e.g., money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

The player maintains an inventory for the player's character in which virtual awards may be collected. The inventory may be accessed through an interface. As the character or other entity progresses through the game it may receive access to higher-level items. Higher-level items may be more powerful and/or effective within the game. This may include having parameters (e.g., hit points, attack strength, defense points, speed, etc.) that enhance the functionality of the items in the game. The player may be able to review items within the player's inventory and equip the character and/or other entity with an item appropriate to the current game situation. Items may be dragged from the inventory to a preview window. As items are selected, they may appear either on or next to the character or entity. For example, if the character entity is currently not building and/or researching anything, a building may be built and/or research may be started by—accessing the character's inventory and utilizing virtual items. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency. In such games, the virtual currency might be represented by virtual coins, virtual cash, or by a number or value stored by the server for that player's benefit. Such virtual currency may represent units of value for use as consideration in transactions in the online game system, and/or may be analogous to legal currency. Virtual currency can be purchased for real money consideration. Such purchases may be made for cash or credit denominated in real money, made be made for another virtual currency previously purchased by a player for real money (e.g., Facebook credits, Bitcoins, and/or other virtual currency). A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may be awarded for leveling up in the game.

The game module 20 may be configured to execute a game instance of a game space. The game instance may be used to facilitate presentation of views of the game space to players. The game instance may be configured to facilitate interaction of the players with the game space and/or each other by performing operations in the game instance in response to commands and/or any other input received from the players.

The game module 20 may be configured to implement the instance of the virtual space executed by the computer modules to determine state of the virtual space. The state may then be communicated (e.g., via streaming visual data, via object/position data, and/or other state information) from server(s) 12 to client computing platform(s) 14 for presentation to players. The state determined and transmitted to a given client computing platform(s) 14 may correspond to a view for a player character being controlled by a player via the given client computing platform(s) 14. The state determined and transmitted to a given client computing platform(s) 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the player.

The instance of the virtual space may comprise a simulated space that is accessible by players via clients (e.g., client computing platform(s) 14) that present the views of the virtual space to a player. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by game module 20 is not intended to be limiting. The game module 20 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 20, players may control characters, objects, simulated physical phenomena (e.g., wind, rain, earthquakes, and/or other phenomena), and/or other elements within the virtual space to interact with the virtual space and/or each other. The player characters may include avatars. As used herein, the term "player character" may refer to an object (or group of objects) present in the virtual space that represents an individual player. The player character may be controlled by the player with which it is associated. The player controlled element(s) may move through and interact with the virtual space (e.g., non-player characters in the virtual space, other objects in the virtual space). The player controlled elements controlled by and/or associated with a given player may be created and/or customized by the given player. The player may have an "inventory" of virtual goods and/or currency that the player can use (e.g., by manipulation of a player character or other player controlled element, and/or other items) within the virtual space.

The players may participate in the instance of the virtual space by controlling one or more of the available player controlled elements in the virtual space. Control may be exercised through control inputs and/or commands input by the players through client computing platform(s) 14. The players may interact with each other through communications exchanged within the virtual space. Such communications may include one or more of textual chat, instant messages, private messages, voice communications, and/or other communications. Communications may be received and entered by the players via their respective client computing platform(s) 14. Communications may be routed to and from the appropriate players through server(s) 12 (e.g., through game module 20).

The secondary game module 22 may be configured to selectively provide access to the players of a secondary game to facilitate player participation in individual episodes of the secondary game, an individual episode including one or more players. For a first episode, the secondary game may be configured to obtain a set of potential awards for the first episode, and provide a first turn to a first player. The individual potential awards may include virtual items usable in the online game. For the first turn, the secondary game module 22 may be configured to obtain a set of award probabilities for the set of potential awards (e.g., on a per-potential award basis). Based on the set of award probabilities, secondary game module 22 may stochastically, or quasi-stochastically, select a first potential award as an actual award for distribution for the first turn. Based on such selection, the secondary game module 22 may distribute the first potential award to the first player for use within the online game.

The potential awards may include premium items highly sought after in the online game, items that may be used to augment and/or enhance other items, such as items rewarded by the events within the online game, improvements to one or more player parameters, virtual services (e.g., enhanced graphics of the online game provided to the players), and/or any other awards that may be provided through the secondary game. The individual potential awards for the secondary game may be predetermined by the provider, administrator, moderator, and/or any other entities related to the online game at a configuration stage of the system. Simultaneously or alternatively, the individual potential awards may be determined dynamically during the instance of the online by the provider, administrator, moderator, and/or any other entities related to online game. In some examples, the potential awards of the secondary game may be dynamically determined based on one or more items rewarded by events in the online game.

The secondary game module 22 may be configured to effectuate presentation of an offer to the first player for a second turn in the first episode. The offer may include a cost for the second turn. Presentation of the offer may be effectuated based on completion of the first turn. Responsive to the first player accepting the offer and reception of payment of the cost from the first player, the secondary game module 22 may provide a second turn of the first episode to the first player. For the second turn, the secondary game module 22 may be configured to obtain a set of award probabilities for the set of remaining potential awards (e.g., the set of potential awards minus the first potential award). Based on the obtained set of award probabilities, the secondary game module 22 may stochastically, or quasi-stochastically, select a second potential award as an actual award for distribution for the second turn. The secondary game module 22 may then distribute the second potential award to the first player for use within the online game.

The secondary game module 22 may be configured to determine the cost for the second turn based on potential awards included in the set of remaining potential awards. The cost may be determined on value of the items left and/or the item awarded. In some implementations, the greater the value of the remaining items and/or items awarded, the greater the cost to the player for an additional turn. In some implementations, the greater the value of the items left and/or items awarded, the lower the cost to the player for an additional turn. In some implementations, the lower the value of the remaining items and/or items awarded, the greater the cost to the player for additional turns. In some implementations, the lower the value of the remaining items and/or items awarded, the lower the cost for additional turns. In some implementations, the cost for additional turns may be randomly determined. In some implementations, the operator may determine the cost for additional turns. In some implementations, the player may be awarded free turns, which can be used during the current secondary game and/or at a later time. In some implementations, the player may be provided the opportunity to purchase a bundle of turns at a discount rate (e.g., purchasing five turns for a cost lower than purchasing the turns individually). In some implementations, players may share purchased turns with other players. In some implementations, players may share the items awarded with other players. The secondary game module 22 may be configured to determine the set of award probabilities based on the values of remaining potential awards. The remaining potential award may be the set of potential awards minus distributed potential awards and/or any other awards. In some implementations, the higher value items may have a higher and/or lower probability. In some implementations, the lower value items may have a higher and/or lower probability. In some implementations, the award probabilities may be determined based on algorithm. In some implementations, the award probabilities may be determined based on a lookup table. In some implementations, the award probabilities may be randomly determined. In some implementations, an operator may determine the award probabilities. In some implementations, the award probabilities may be based on player account information (e.g., depend on the player level, might, etc.). In some implementations, the award probabilities may be determined based on idle time periods during the day and/or any other time periods. In some implementations, the award probabilities may be determined based on player team information. In some implementations, the award probabilities may be determined based on in-game tournaments, and/or any other in-game promotional events.

The secondary game module 22 may be configured to determine the set of award probabilities for the second turn based on the value of the first potential award and/or any other awards. The secondary game module 22 may be configured to provide additional turns to the player until the set of potential awards and/or any other awards have been distributed.

In an individual turn of the secondary game, a given player may engage in the gameplay provided by the secondary game to win one or more of the potential awards. For determining an outcome of the individual turn of the secondary game, the secondary game module 22 may be configured to stochastically or quasi-stochastically select one of the potential awards as an actual award for distribution to the given player as a result of the gameplay engaged in by the given player based on the award probabilities with the individual ones of the potential awards. In some examples, the gameplay provided by the secondary game may include chance-based gameplay, such as random player selection, random automatic selection, dice, wheel spinning, roulette, spinning tops, card drawing, lottery, and/or any other chance-based gameplays. By way of a non-limiting example, in one instance, the secondary game may include a wheel spin gameplay, wherein for an individual turn, a player may spin the wheel (as simulated by the secondary game module 22) to win potential awards provided by the secondary game. In that instance, to simulate the wheel spin gameplay for the individual turn, the secondary game module 22 obtains a set of award probabilities associated with the individual potential rewards (e.g., 10% of chance the wheel stops at a top award, 20% stops at the second top award, and so on). With the obtained award probabilities and the potential awards, the secondary game module 22 may simulate the wheel spin for the individual turn and select an actual award from the potential awards according to the stopping point of the wheel. In some exemplary implementations, the secondary game module 22 may employ a dice function for effectuating such simulation such that the inputs of the dice function are the potential award set and the award probabilities and the output is an actual award.

In response to the selection of the actual award for the individual turn, the secondary game module 22 may be configured to effectuate distribution of the selected actual award to the player engaging in the individual turn. This may involve distributing the actual award to the inventory of the player.

By way of a non-limiting example, a player may preview a set of prizes (e.g., A, B, C, D and E) available to the player prior to the start of the game. The prizes may be placed into identical containers and then randomized. The player may then choose to select a container to be opened, and the player may win the prize associated with the particular container. With four remaining containers, the player may choose to open a second container. The cost of opening the second container may be higher than the cost of opening the first container. The cost of opening the first container may be free. The player may be provided the option to open all of the containers individually, the cost of each turn may increase each time the player selects another container. The player is guaranteed to win all of the prizes (e.g., A, B, C, D and E) as long as the player pays for each additional prize. The order of the items revealed by the container opening may be predetermined and/or certain items may have a greater probability of being selected early in the selection process. The player may have the option to continue playing the secondary game by purchasing further selections, or return to the primary game.

The network module 24 of the game server(s) 12 may be configured to maintain a connection to the one or more client computing platform(s) 14. For example, the network module 24 may maintain one or more communication lines or ports to enable connection and/or exchange of information with a network 34 and/or other computing platform(s) 14. Information such as state information, game state and game logic may be communicated via network module. The network module 24 may be configured to receive information from the client computing platform(s) 14 as well.

The store module 26 may be configured to present a store interface to the players. The store interface may present offers to players to buy item instances of virtual items. The virtual items may include a first virtual item and/or any other item. A virtual item may be an item that can be used in the game instance by the player. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

A store module 26 may be configured to effectuate presentation to the players of offers to purchase resources. The offers may include a first offer for the first player to purchase a first set of one or more virtual items. The virtual items may include a virtual good, a virtual currency, and/or other virtual items as described above. For example, the store module may be configured such that the offers presented to the first player may be restricted to offers having prices in a first price range. The first price range may be determined based on the player metric for the first player, and/or the player metric for other players. The store module 26 may be configured such that the first price range may change as participation by the first player in the game causes the player metric for the first player to change. The store module 26 may be configured such that the first price range may be bounded by one or more both of a minimum value and/or a maximum value. The store module 26 may be configured such that the offers having prices below the minimum value may not be available for purchase by the first player. The store module 26 may be configured such that offers having prices above the maximum value may be locked. This may mean the offers having prices above the maximum value may be unavailable for purchase by the first player independent from whether the first player has consideration sufficient to purchase such offers. Such offers may become unlocked as the maximum value of the price range is adjusted above the prices of such offers.

For example, players' experience with pricing of in-game goods may be associated with their progress in the game. In some implementations, the higher the level of the player, the lower the in-game goods may cost. Depending on the level of the player, the goods available to the player may change. Overall, the more the player advances in the game, new items may be unlocked to the player for purchase. Goods previously provided to the player for purchase may or may not be accessible to the player depending on the player's level.

The game server(s) 12, client computing platform(s) 14, and/or external resource(s) 36 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, client computing platform(s) 14, and/or external resource(s) 36 may be operatively linked via some other communication media.

Game server(s) 12 may include electronic storage 32, one or more processors 16, and/or other components. Game server(s) 12 may include communication lines, or ports to enable the exchange of information with a network 34 and/or other computing platforms 14. Illustration of game server(s) 12 in FIG. 1 is not intended to be limiting. Game server(s) 12 may include a plurality of hardware, software, and/or firmware components operating together to provide the functionality attributed herein to game server(s) 12. For example, game server(s) 12 may be implemented by a cloud of computing platforms operating together as game server(s) 12.

Electronic storage 32 may comprise non-transitory storage media that electronically stores information. The electronic storage media of electronic storage 32 may include one or both of system storage that is provided integrally (i.e., substantially non-removable) with game server(s) 12 and/or removable storage that is removably connectable to game server(s) 12 via, for example, a port (e.g., a USB port, a firewire port, etc.) or a drive (e.g., a disk drive, etc.).

Electronic storage 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 32 may include one or more virtual storage resources (e.g., cloud storage, a virtual private network, and/or other virtual storage resources). Electronic storage 32 may store software algorithms, information determined by processor(s) 16, information received from game server(s) 12, information received from client computing platform(s) 14, and/or other information that enables game server(s) 12 to function as described herein.

Processor(s) 16 is configured to provide information processing capabilities in game server(s) 12. As such, processor(s) 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute modules 18, 20, 22, 24, and/or 26. Processor(s) 16 may be configured to execute modules 18, 20, 22, 24, and/or 26 by software; hardware; firmware; some combination of software, hardware, and/or firmware; and/or other mechanisms for configuring processing capabilities on processor(s) 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24, and/or 26 are illustrated in FIG. 1 as being implemented within a single processing unit, in implementations in which processor includes multiple processing units, one or more of modules 18, 20, 22, 24, and/or 26 may be implemented remotely from the other modules. The description of the functionality provided by the different modules 18, 20, 22, 24, and/or 26 described below is for illustrative purposes, and is not intended to be limiting, as any of modules 18, 20, 22, 24, and/or 26 may provide more or less functionality than is described. For example, one or more of modules 18, 20, 22, 24, and/or 26 may be eliminated, and some or all of its functionality may be provided by other ones of modules 18, 20, 22, 24, and/or 26. As another example, processor(s) 16 may be configured to execute one or more additional modules that may perform some or all of the functionality attributed below to one of modules 18, 20, 22, 24, and/or 26.

A given client computing platform(s) 14 may include one or more processors configured to execute computer program modules. The computer program modules may be configured to enable an expert or player associated with the given client computing platform(s) 14 to interface with system 10, game server(s) 12, and/or external resource(s) 36, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 36 may include sources of information, hosts and/or providers of virtual spaces outside of system 10, external entities participating with system 10, and/or other resources. In some implementations, some or all of the functionality attributed herein to external resource(s) 36 may be provided by resources included in system 10.

Figure 2:
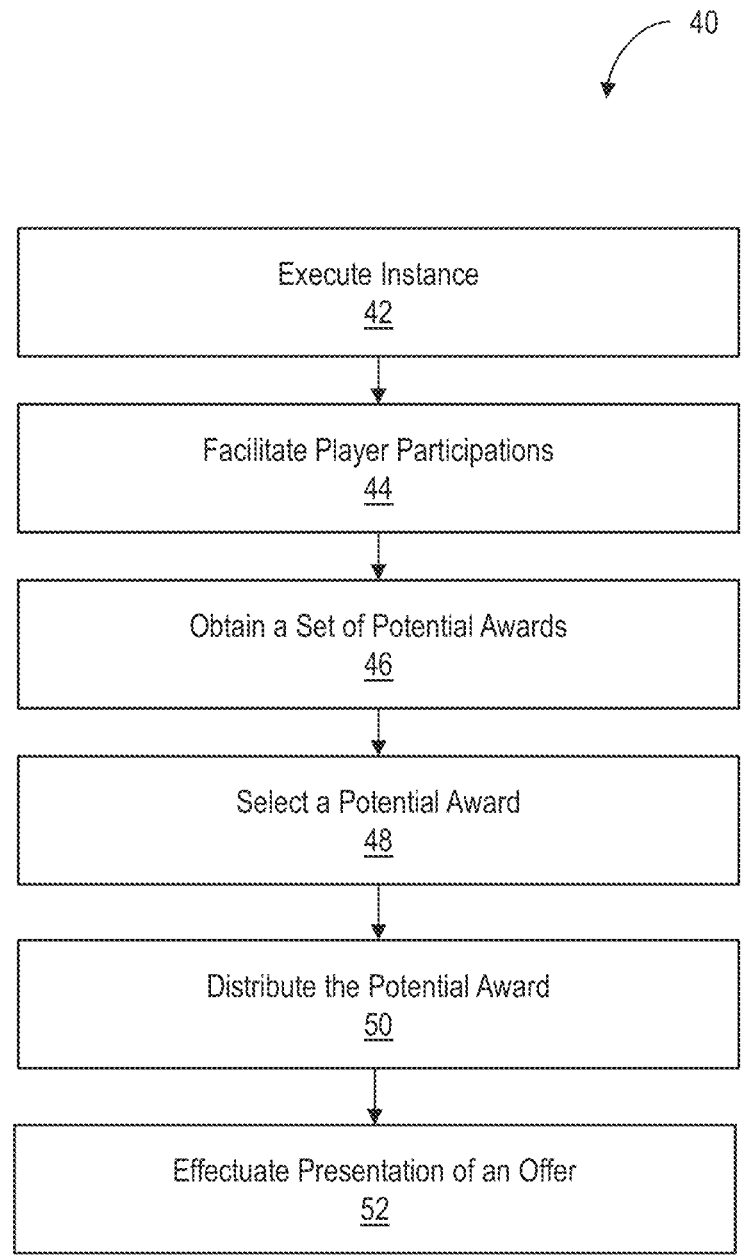
FIG. 2 illustrates an exemplary method of implementing a secondary game within an online game, according to an aspect of the invention.

FIG. 2 illustrates a method 40 configured to facilitate providing a tiered rebate system to a player of an online game, according to an aspect of the invention. The operations of method 40 presented below are intended to be illustrative. In some embodiments, method 40 may be accomplished with one or more additional operations not described, and/or without one or more of the operations discussed. The order in which the operations of method 40 are illustrated in FIG. 2 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, an instance of a virtual space may be executed. In some implementations, operation 42 may be performed by a game module the same as or similar to game module 20 (shown in FIG. 1 and described above).

At an operation 44, the executed instance of the virtual space may facilitate player participations. The individual episode may include one or more players. In some implementations, operation 44 may be performed by a secondary game module the same as or similar to secondary game module 22 (shown in FIG. 1 and described above).

At an operation 46, a set of potential awards may be obtained. The individual potential awards may include virtual items usable in the online game. In some implementations, operation 46 may be performed by a secondary game module the same as or similar to secondary game module 22 (shown in FIG. 1 and described above).

At an operation 48, a potential award may be selected. In some implementations, operation 48 may be performed by a secondary game module the same as or similar to secondary game module 22 (shown in FIG. 1 and described above).

At an operation 50, the potential awards may be distributed. In some implementations, operation 50 may be performed by a secondary game module the same as or similar to secondary game module 22 (shown in FIG. 1 and described above).

At an operation 52, presentation of an offer may be effectuated. In some implementations, operation 52 may be performed by a secondary game module the same as or similar to secondary game module 22 (shown in FIG. 1 and described above).

Figure 3:
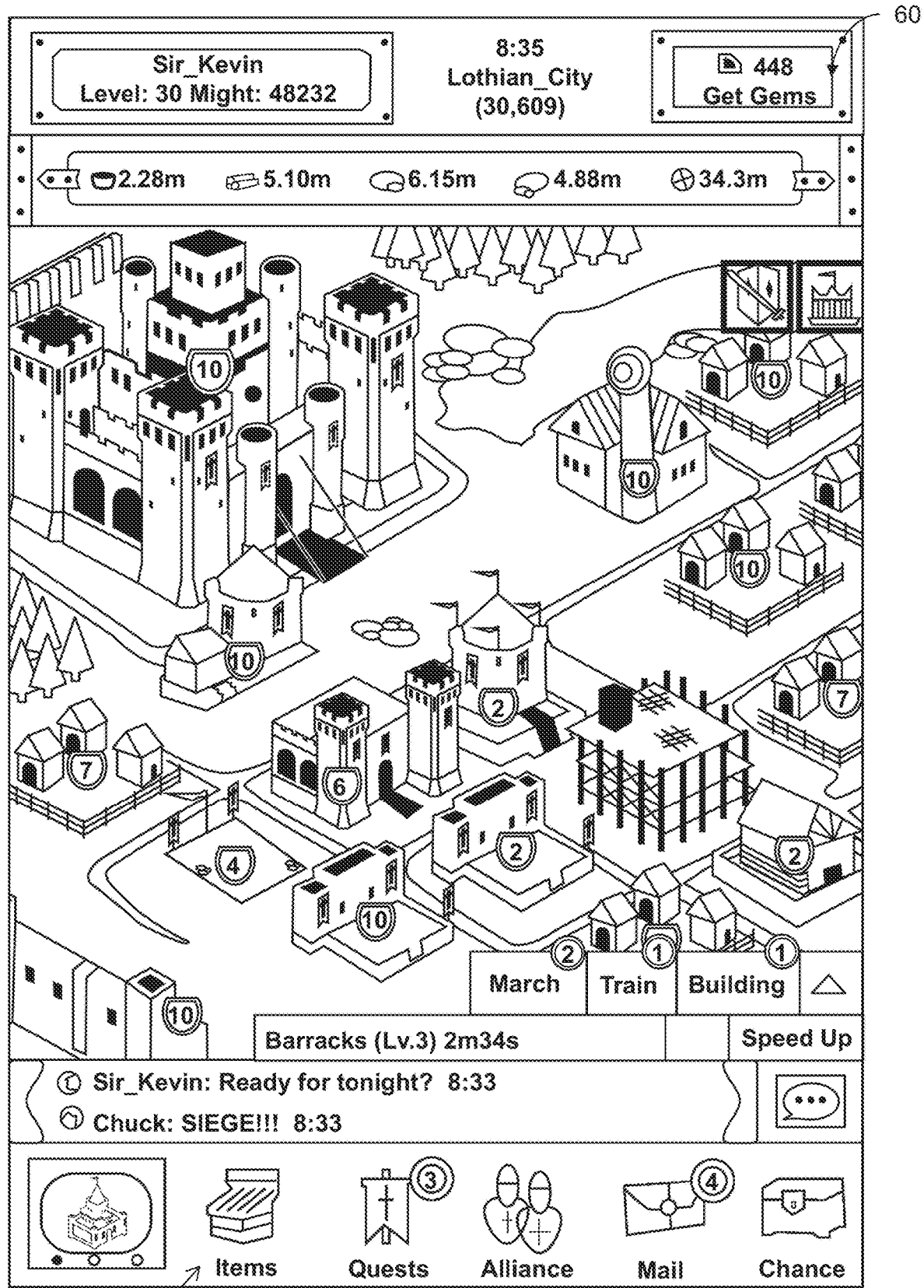
FIG. 3 illustrates an exemplary diagram of a player interface which implements a secondary game within an online game, according to an aspect of the invention.

FIG. 3 illustrates an exemplary diagram of a player interface which implements a secondary game within an online game, according to an aspect of the invention. As shown, user interface 60 enables a user to view a list of virtual items available for purchase by selecting the items 62 tab.

Figure 4:
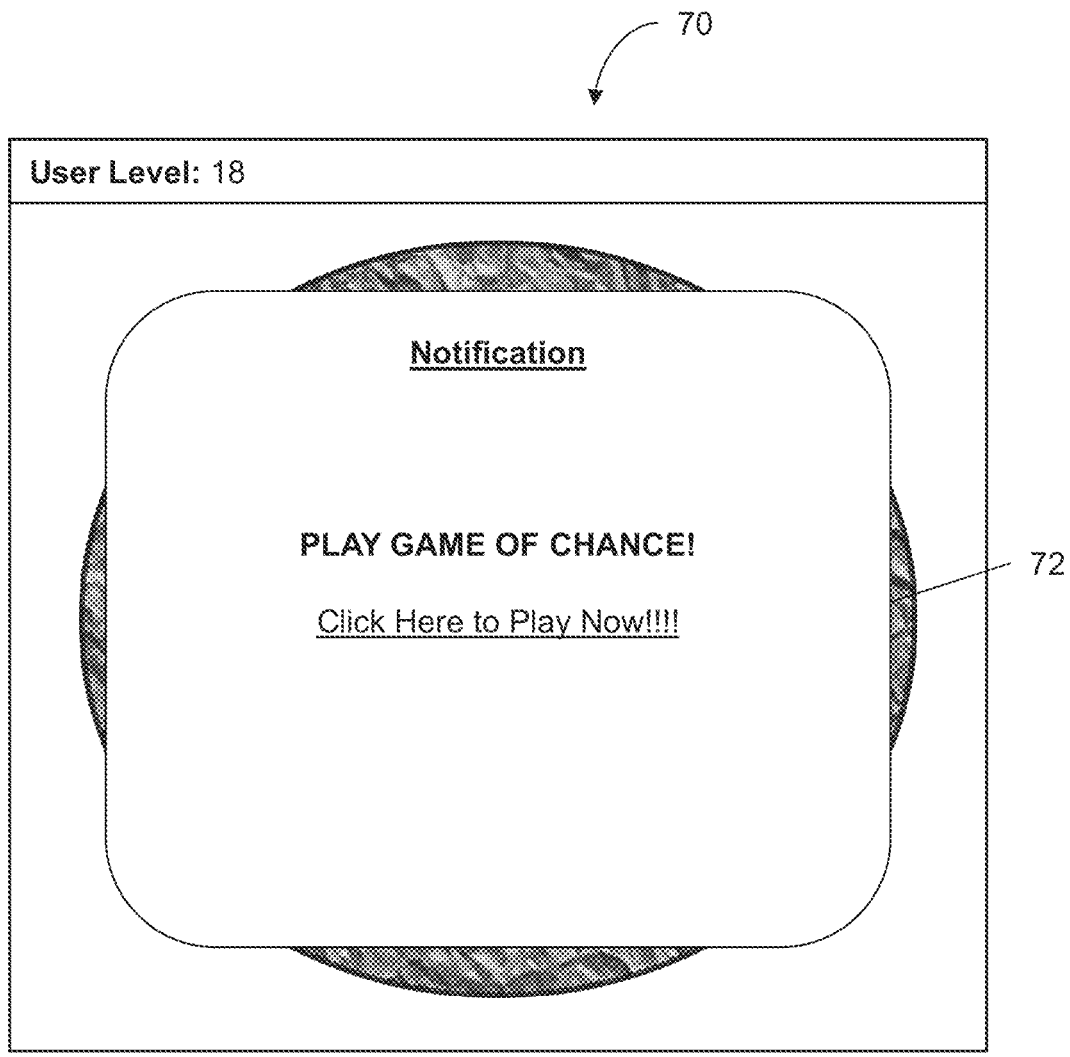
FIG. 4 illustrates an exemplary diagram of a player interface which implements a secondary game within an online game, according to an aspect of the invention.

FIG. 4 illustrates an exemplary diagram of a player interface 70 which a secondary game within an online game, according to an aspect of the invention. A player may receive a notification 72 at any time to entice them to play the secondary game. Secondary game notifications may be in various forms including taking the form of banners, scrolling text or tickers, flashing objects, pop-up windows, frames or borders, and/or any other type of notification during and/or after the execution of the game.

Figure 5A:
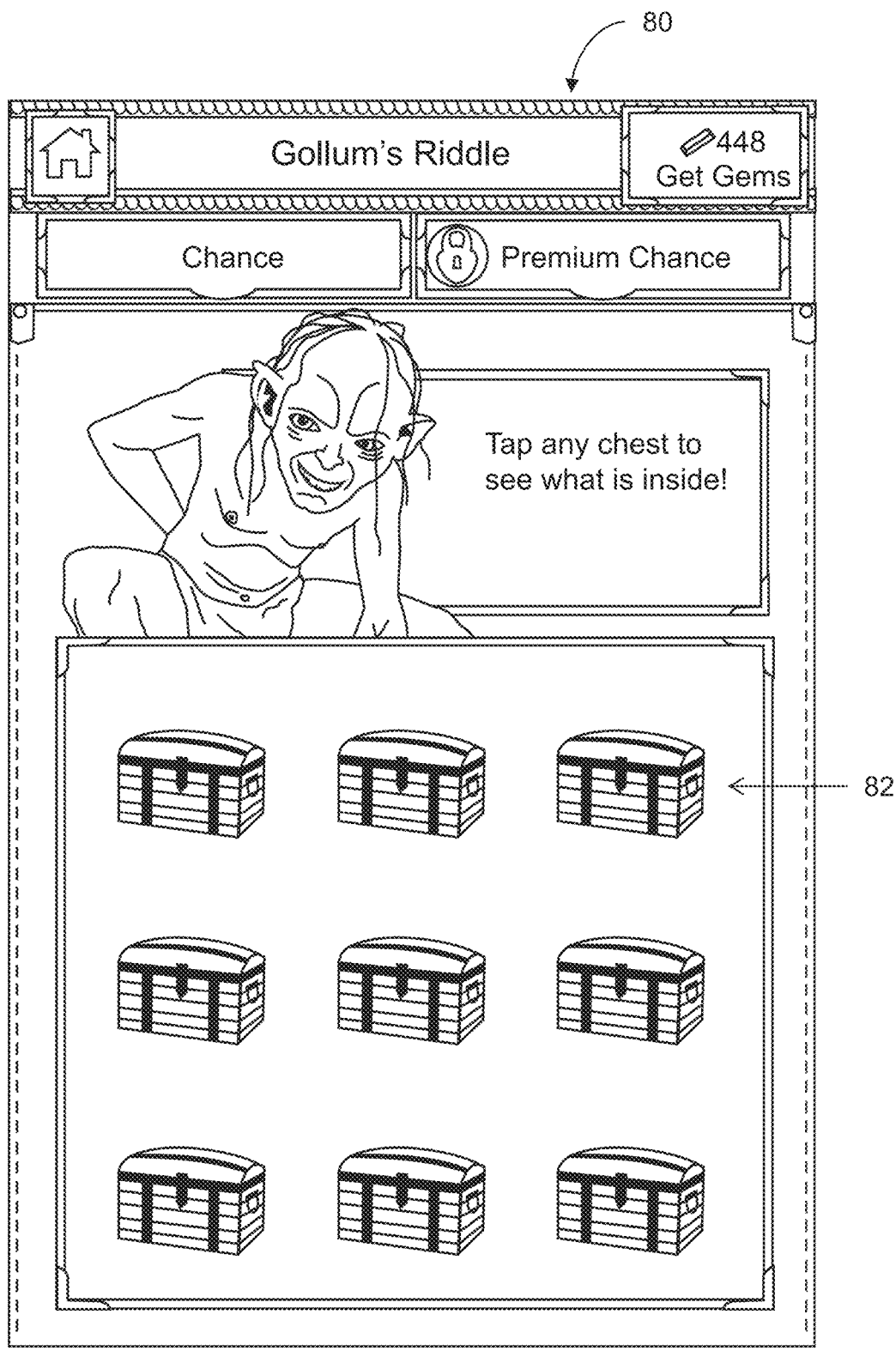
FIG. 5A illustrates an exemplary diagram of a player interface which implements a secondary game within an online game, according to an aspect of the invention.

FIG. 5A illustrates an exemplary diagram of a player interface 80 which implements a secondary game within an online game, according to an aspect of the invention. As shown, player interface 80 enables a player to view a plurality of identical virtual containers for selection 82.

Figure 5B:
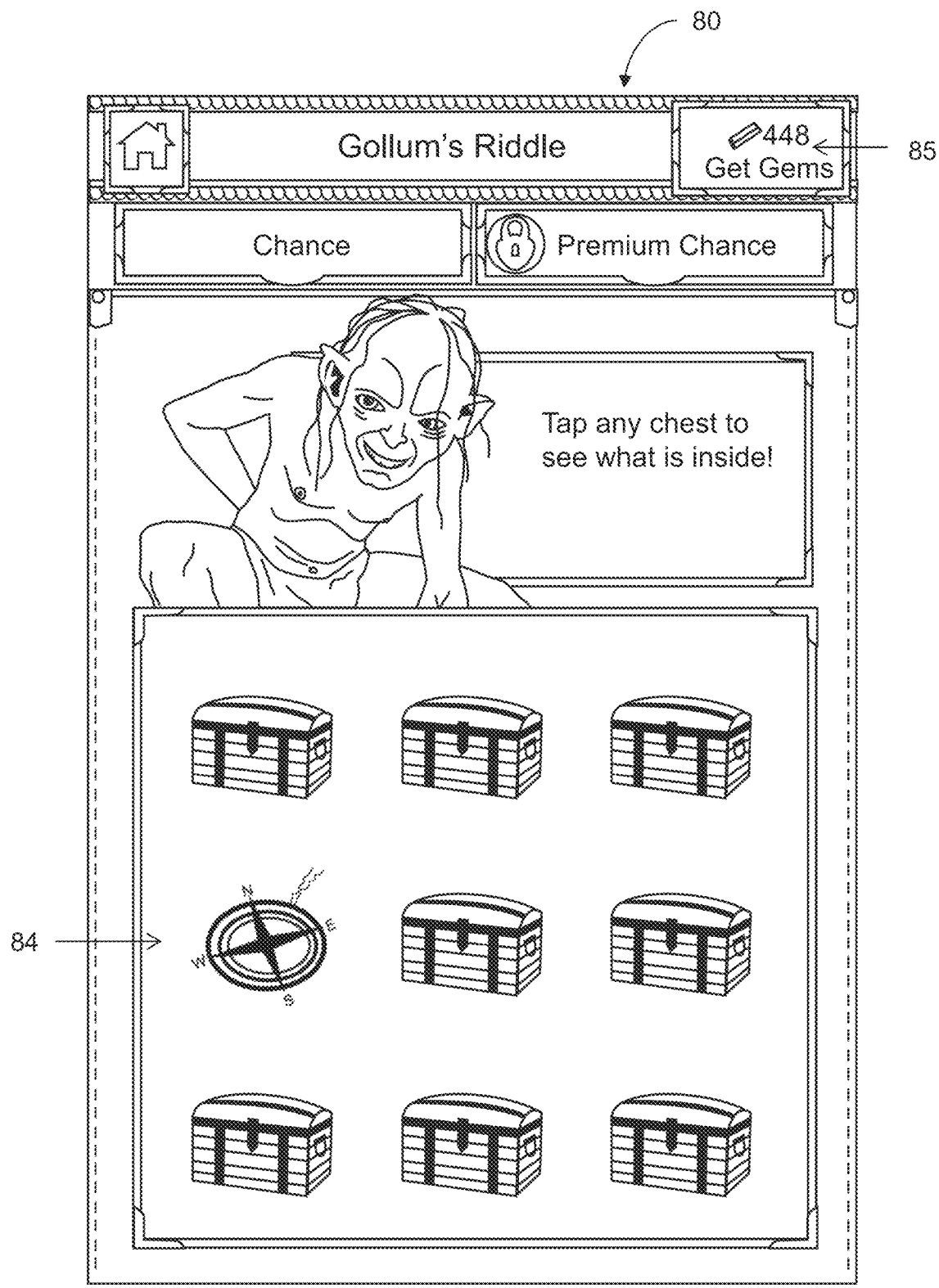
FIG. 5B illustrates an exemplary diagram of a player interface which implements a secondary game within an online game, according to an aspect of the invention.

FIG. 5B illustrates an exemplary diagram of a player interface 80 which implements a secondary game within an online game, according to an aspect of the invention. As shown, player interface 80 enables a player to select a first virtual container 84 which may contain a virtual item that may be implemented in the primary game. The first player turn may be free, or at a cost 85 to the player.

Figure 5C:
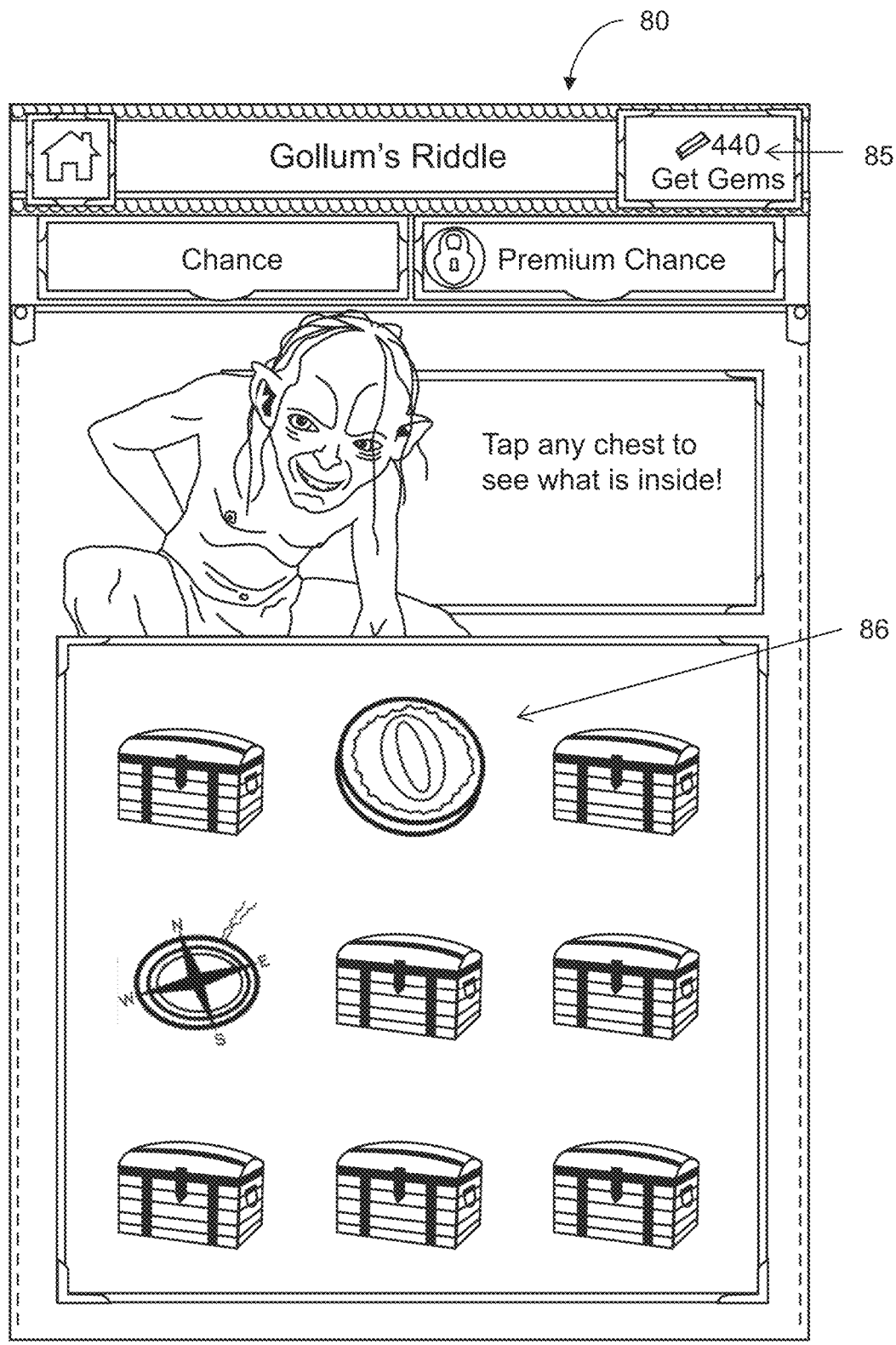
FIG. 5C illustrates an exemplary diagram of a player interface which implements a secondary game within an online game, according to an aspect of the invention.

FIG. 5C illustrates an exemplary diagram of a player interface 80 which implements a secondary game within an online game, according to an aspect of the invention. As shown, player interface 80 enables a player to select a second virtual container 86 which may contain a virtual item that may be implemented in the primary game. In some implementations, the second player turn may cost 85 more that the first player turn.

Figure 5D:
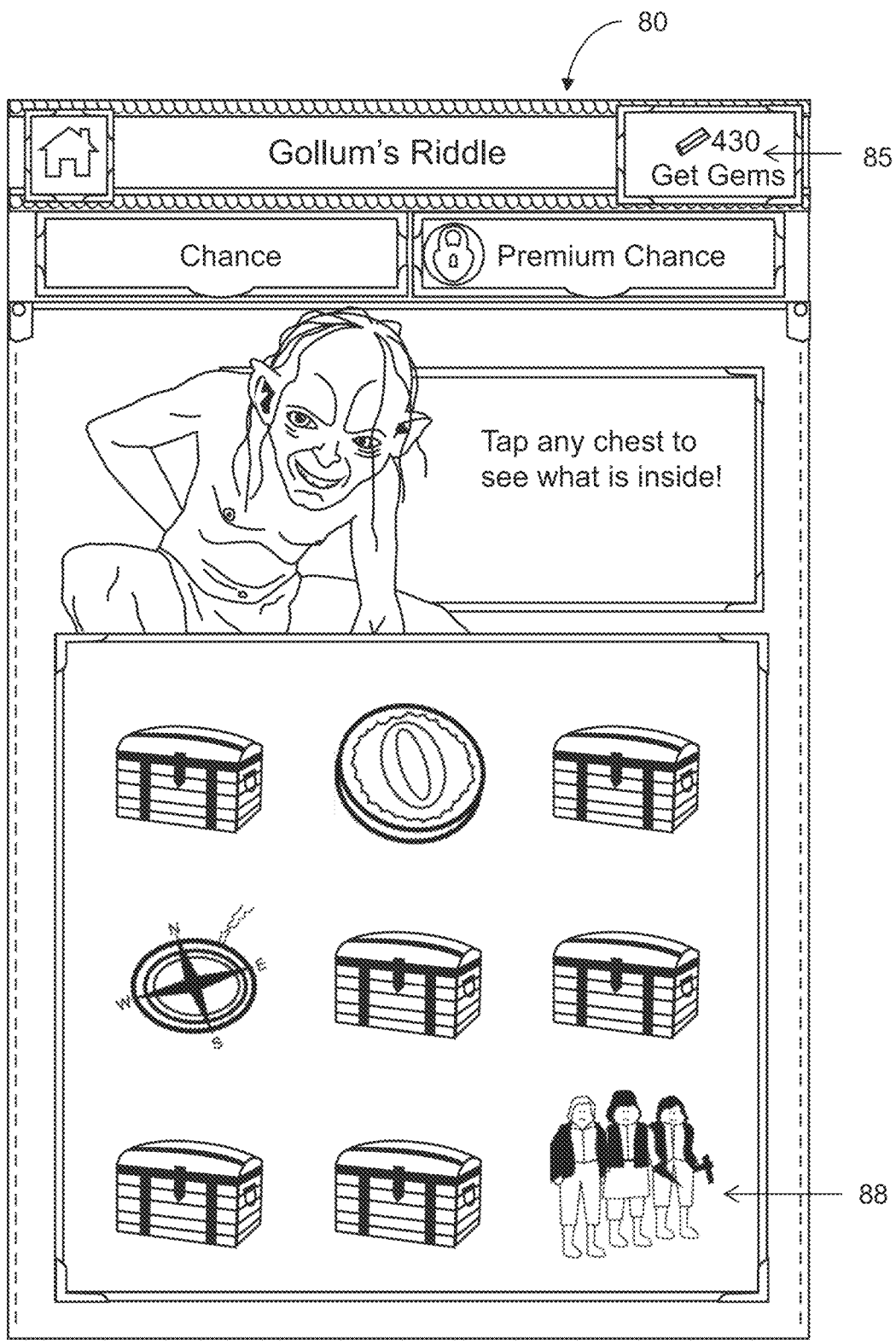
FIG. 5D illustrates an exemplary diagram of a player interface which implements a secondary game within an online game, according to an aspect of the invention.

FIG. 5D illustrates an exemplary diagram of a player interface 80 which implements a secondary game within an online game, according to an aspect of the invention. As shown, player interface 80 enables a player to select a third virtual container 88 which may contain a virtual item that may be implemented in the primary game. In some implementations, the third player turn may cost 85 more that the first and/or second player turn.

Figure 6:
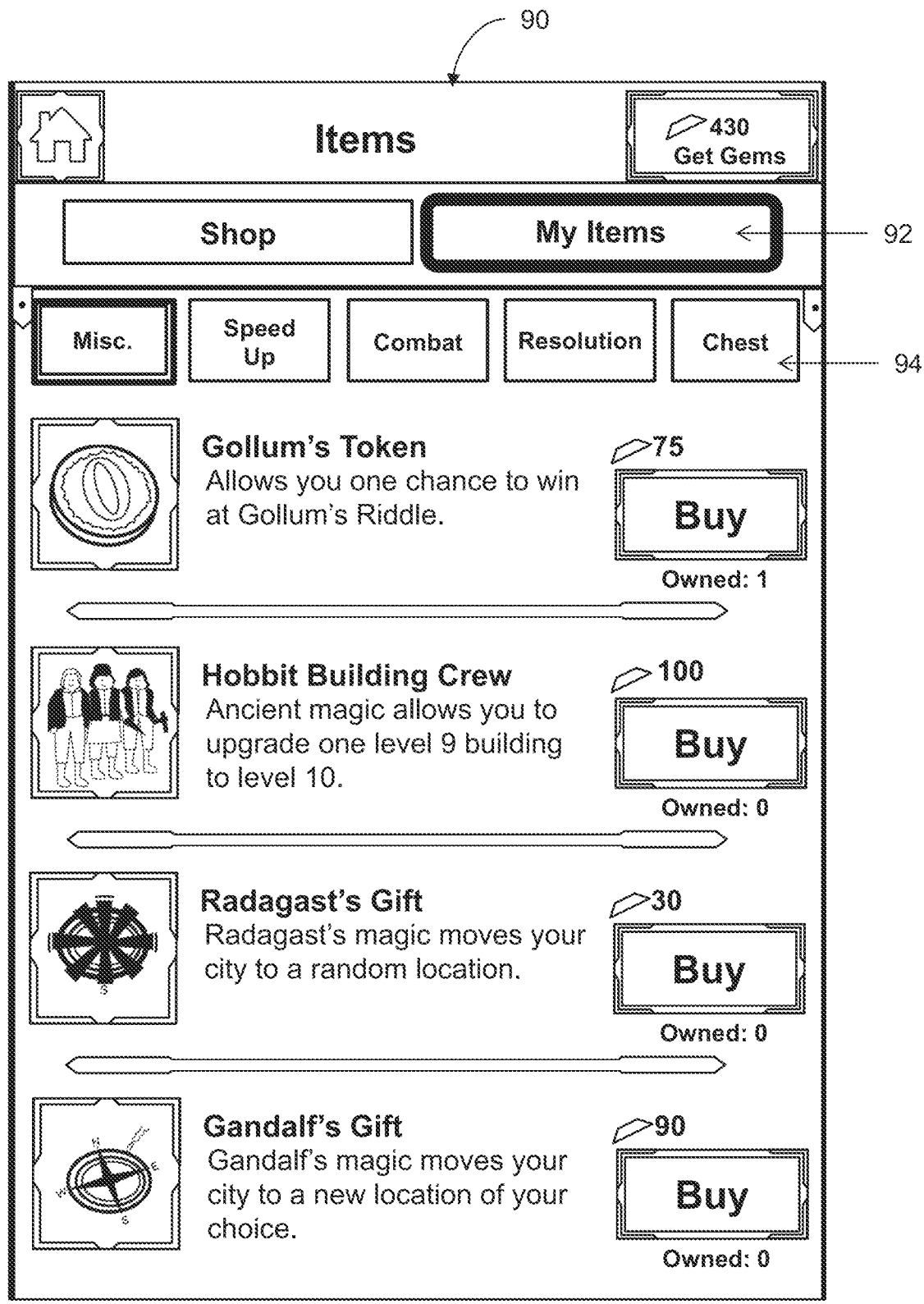
FIG. 6 illustrates an exemplary diagram of a player interface which implements a secondary game within an online game, according to an aspect of the invention.

FIG. 6 illustrates an exemplary diagram of a player interface 90 which implements a secondary game within an online game, according to an aspect of the invention. In some implementations, the player may select the my items tab 92, and view from a category 94 of virtual in-game goods obtained.

Figure 7:
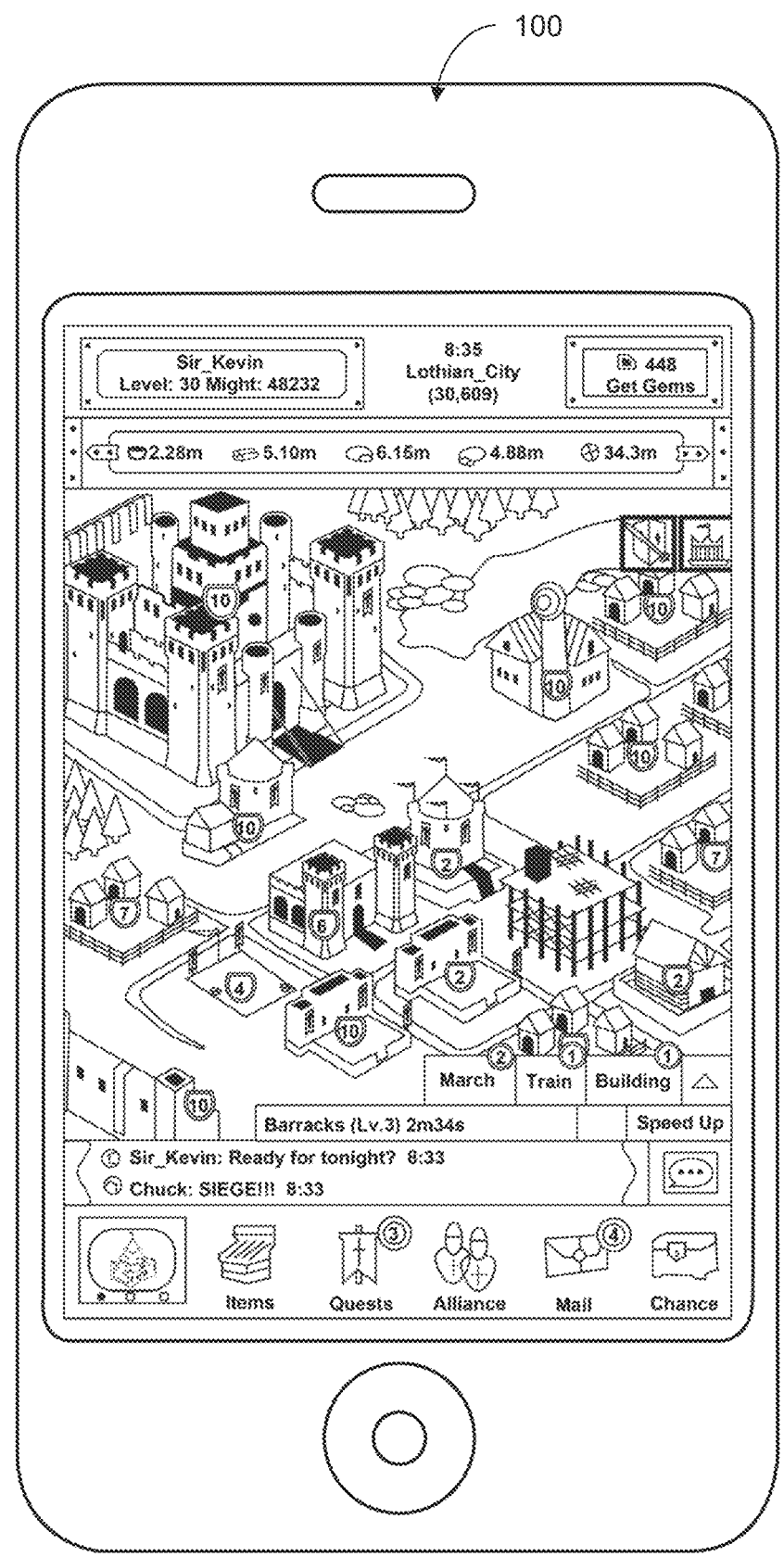
FIG. 7 illustrates an exemplary diagram of a player interface which implements a secondary game within an online game, according to an aspect of the invention.

FIG. 7 illustrates an exemplary diagram of a player interface 100 which implements a secondary game within an online game, according to an aspect of the invention. There may be several platforms in which the game may be implemented. Some platforms may include hardware platforms, operating system platforms and/or software platforms. In some implementations, hardware platform may include different types of systems in general (e.g., mainframe, workstation, desktop, handheld and/or embedded) and/or the specific type of processor (e.g., x86, SPARC, PowerPC and/or Alpha).

Figure 8:
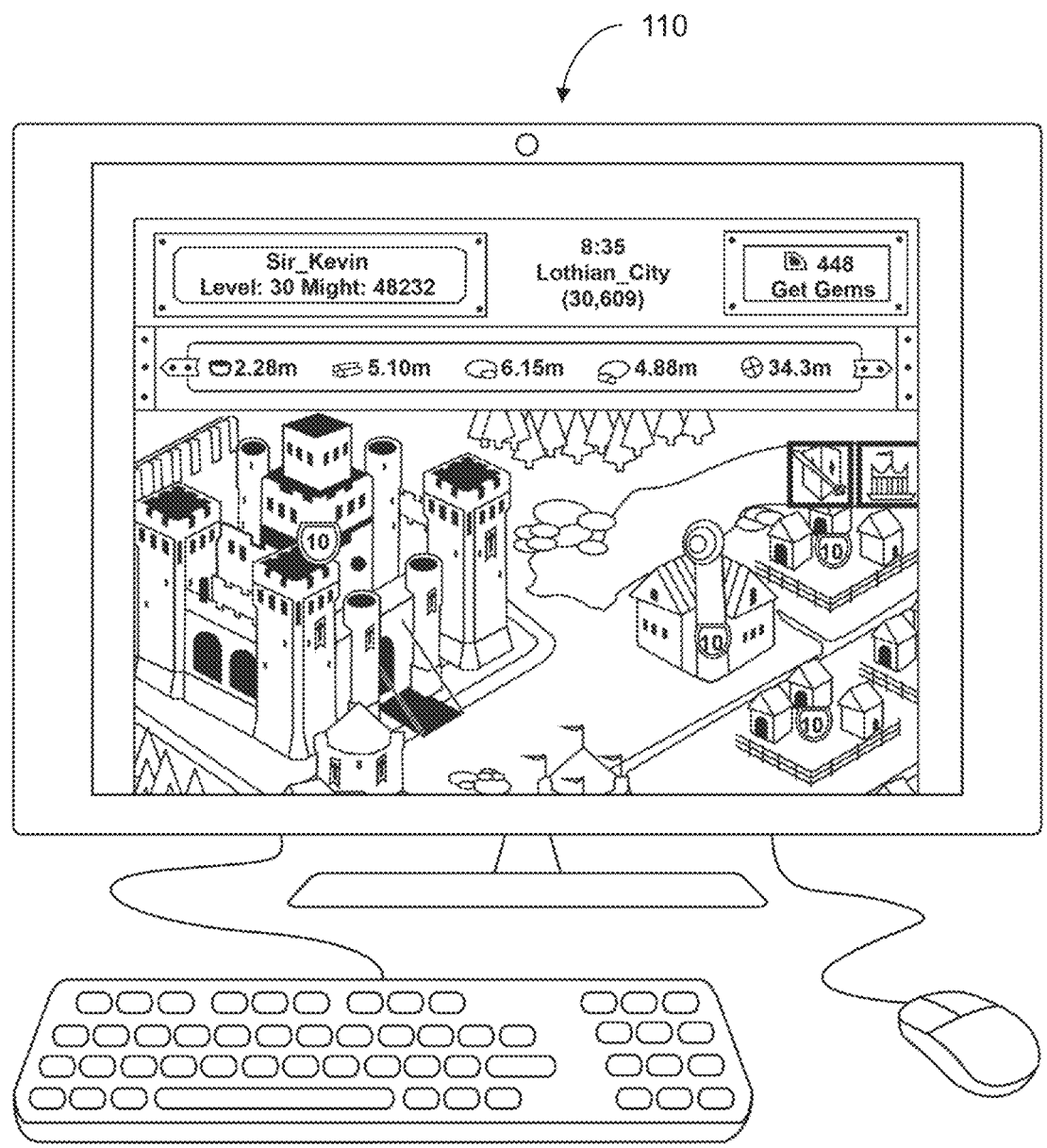
FIG. 8 illustrates an exemplary diagram of a player interface which implements a secondary game within an online game, according to an aspect of the invention.

FIG. 8 illustrates an exemplary diagram of a player interface 110 which implements a secondary game within an online game, according to an aspect of the invention.

Figure 9:
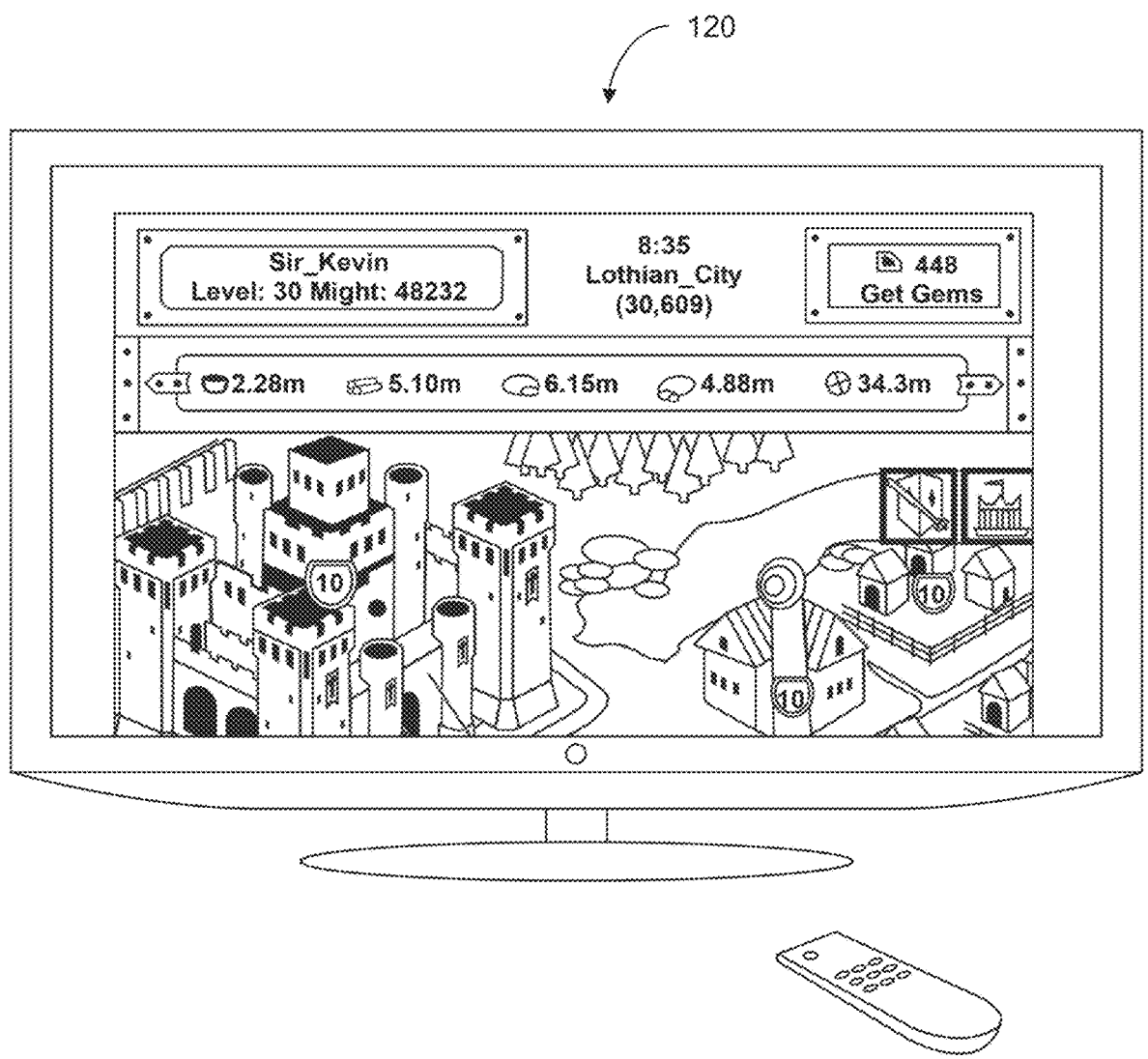
FIG. 9 illustrates an exemplary diagram of a player interface which implements a secondary game within an online game, according to an aspect of the invention.

FIG. 9 illustrates an exemplary diagram of a player interface 120 which implements dynamic content availability for individual players, according to an aspect of the invention.

It would be understood by one of ordinary skill in the art that the player interfaces may not be limited to the embodiment illustrated in FIGS. 3-9. The player interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating displaying of virtual containers, the system comprising:
   one or more processors configured by machine-readable instructions to:
   execute an instance of online game, to implement the instance of the online game by receiving and executing commands in the instance of the online game to facilitate player participation in the online game, and to facilitate presentation of the online game on client computing platforms;
   selectively provide access to the players of a secondary game to facilitate player participation in individual episodes of the secondary game, an individual episode including one or more players;
   obtain a set of potential awards for a first episode, and provide a first turn to a first player, the set of potential awards being predefined and including individual potential awards having different values and the individual potential awards including virtual items usable in the online game, wherein the set of potential awards includes a finite quantity of potential awards, wherein for the first turn, the one or more processors are configured by machine-readable instructions to:
   display a user interface displaying an interface element for each of the finite quantity of potential awards;
   obtain a set of award probabilities for the set of potential awards;
   stochastically or quasi-stochastically, select a first potential award as an actual award for distribution for the first turn based on the award probabilities;
   receive a selection of a first interface element of one of the interface elements; and
   distribute the first potential award to the first player for use within the online game based on the selection of the first interface element;
   determine a cost for a second turn based on values of remaining potential awards, wherein the remaining potential awards are the set of potential awards minus distributed potential awards, wherein, the greater a value of the remaining potential awards, the greater a cost to the first player for the second turn;
   effectuate presentation of an offer to the first player for the second turn in the first episode, the offer including the cost for the second turn;
   responsive to the first player accepting the offer and reception of payment of the cost from the first player, providing the second turn of the first episode to the first player, wherein for the second turn, the one or more processors are configured by machine-readable instructions to:

modify an appearance of the first interface element within the user interface to indicate the first interface element was previously selected;

obtain a set of award probabilities for the set of potential awards minus the first potential award;

stochastically or quasi-stochastically, select a second potential award as an actual award for distribution for the second turn based on the award probabilities; and distribute the second potential award to the first player for use within the online game;

wherein the number of subsequent turns available to the user is equal to the quantity of potential awards remaining in the set of potential awards, wherein a cost of subsequent turns is increased when the value of distributed potential awards is less than the value of the potential rewards remaining in the set of potential awards, and wherein a cost of subsequent turns is decreased when the value of distributed potential awards is greater than the value of potential awards remaining in the set of potential awards.

2. The system of claim 1, wherein the one or more processors are further configured by machine-readable instructions to determine the set of award probabilities based on the values of remaining potential awards, wherein remaining potential award are the set of potential awards minus distributed potential awards.

3. The system of claim 1, wherein the one or more processors are further configured by machine-readable instructions to determine the set of award probabilities for the second turn based on the value of the first potential award.

4. The system of claim 1, wherein the one or more processors are further configured by machine-readable instructions to provide additional turns to the player until the set of potential awards have been distributed.

5. The system of claim 1, wherein the one or more processors are further configured by machine-readable instructions to provide additional turns to the player for a higher cost than each prior individual turn.

6. The system of claim 1, wherein the one or more processors are further configured by machine-readable instructions to provide additional turns to the player for a lower cost than each prior individual turn.

7. A computer implemented method for facilitating game events, the method being implemented in a computer system that includes one or more physical processors configured by machine-readable instructions, the method comprising:

executing an instance of a game space, and implementing the instance of the game space to facilitate participation by the players in an online game that takes place in the game space, wherein facilitating interaction of the players with the game space and/or each other by performing operations in the game space in response to commands received from the players;

selectively providing access to the players of a secondary game to facilitate player participation in individual episodes of the secondary game, an individual episode including one or more players, wherein for a first episode, the secondary game is configured to:

obtain a set of potential awards for the first episode, and provide a first turn to a first player, the set of potential awards being predefined including individual potential awards having different values and the individual potential awards including virtual items usable in the online game, wherein the set of potential awards includes a finite quantity of potential awards, wherein for the first turn, the method comprises:

displaying a user interface displaying an interface element for each of the finite quantity of potential awards;

obtaining a set of award probabilities for the set of potential awards;

stochastically or quasi-stochastically, selecting a first potential award as an actual award for distribution for the first turn based on the award probabilities;

receive a selection of a first interface element of one of the interface elements; and distributing the first potential award to the first player for use within the online game based on the selection of the first interface element;

determine a cost for a second turn based on values of remaining potential awards, wherein the remaining potential awards are the set of potential awards minus distributed potential awards, wherein, the greater a value of the remaining potential awards, the greater a cost to the first player for the second turn;

effectuate presentation of an offer to the first player for a second turn in the first episode, the offer including a cost for the second turn;

responsive to the first player accepting the offer and reception of payment of the cost from the first player, provide a second turn of the first episode to the first player, wherein for the second turn, the method comprises:

modifying an appearance of the first interface element within the user interface to indicate the first interface element was previously selected;

obtaining a set of award probabilities for the set of potential awards minus the first potential award;

stochastically or quasi-stochastically, selecting a second potential award as an actual award for distribution for the second turn based on the award probabilities; and distributing the second potential award to the first player for use within the online game;

wherein the number of subsequent turns available to the user is equal to the quantity of potential awards remaining in the set of potential awards, wherein a cost of subsequent turns is increased when the value of distributed potential awards is less than the value of the potential rewards remaining in the set of potential awards, and wherein a cost of subsequent turns is decreased when the value of distributed potential awards is greater than the value of potential awards remaining in the set of potential awards.

8. The method of claim 7, wherein determining the set of award probabilities is based on the values of remaining potential awards, wherein remaining potential award are the set of potential awards minus distributed potential awards.

9. The method of claim 7, wherein determining the set of award probabilities for the second turn is based on the value of the first potential award.

10. The method of claim 7, wherein additional turns are provided to the player until the set of potential awards have been distributed.

11. The method of claim 7, additional turns are provided to the player for a higher cost than each prior individual turn.

12. The method of claim 7, wherein additional turns are provided to the player for a lower cost than each prior individual turn.

\* \* \* \* \*